United States Patent [19]

Kato et al.

[11] Patent Number: 5,289,735
[45] Date of Patent: Mar. 1, 1994

[54] SHIFT KNOB

[75] Inventors: Hiroyuki Kato; Tokuhiro Amano, both of Aichi, Japan

[73] Assignee: Kabushiki Kaisha Tokai Rika Denki Seisakusho, Aichi, Japan

[21] Appl. No.: 725,523

[22] Filed: Jul. 3, 1991

[30] Foreign Application Priority Data

Jul. 5, 1990 [JP] Japan ............................ 2-71611[U]

[51] Int. Cl.$^5$ ................................................ G05G 1/06
[52] U.S. Cl. ........................................ 74/543; 74/538; 74/523; 74/558; 70/202; 70/247
[58] Field of Search ............... 74/558, 523, 536, 543, 74/551.9, 538; 70/247, 202, 238; 16/DIG. 30, 121

[56] References Cited

U.S. PATENT DOCUMENTS

| | | | |
|---|---|---|---|
| 619,223 | 2/1899 | Ramey et al. | 16/121 |
| 701,437 | 6/1902 | Wheeler | 74/551.9 |
| 1,992,901 | 2/1935 | McIntosh | 74/543 |
| 2,449,575 | 9/1948 | Wilhelm | 16/DIG. 30 |
| 3,484,808 | 12/1969 | Conterno | 74/543 |
| 3,693,467 | 9/1972 | Oehl | 74/473 |
| 3,760,651 | 9/1973 | Roseby | 74/523 |
| 3,996,433 | 12/1976 | Suzuki et al. | 200/61.27 |
| 3,998,109 | 12/1976 | O'Brien | 74/538 |
| 4,858,451 | 8/1989 | Balina et al. | 74/543 |
| 4,896,556 | 1/1990 | Takada | 74/523 |
| 5,020,390 | 6/1991 | Chang | 70/202 |
| 5,031,272 | 7/1991 | Carmien | 403/267 |

FOREIGN PATENT DOCUMENTS

| | | |
|---|---|---|
| 2252391 | 5/1974 | Fed. Rep. of Germany . |
| 3601474 | 7/1987 | Fed. Rep. of Germany . |
| 2083784 | 12/1971 | France . |

OTHER PUBLICATIONS

Patent Abstracts of Japan, vol. 015, No. 101, Mar. 11, 1991.
Patent Abstracts of Japan, vol. 011, No. 102, Mar. 31, 1987.
Patent Abstracts of Japan, vol. 014, No. 076, Feb. 13, 1990.

*Primary Examiner*—Carl D. Friedman
*Assistant Examiner*—Winnie Yip
*Attorney, Agent, or Firm*—Finnegan, Henderson, Farabow, Garrett & Dunner

[57] ABSTRACT

A shift knob comprising at least two pieces of material stitched together by stitches and forming a hollow covering body, the hollow being defined by an inner stitched surface, a first resin-formed body disposed within the covering body having an outer surface spaced from the inner stitched surface, and a second resin-formed body disposed in engagement with the entire stitched inner surface. The second resin-formed body completely fills the space between the outer surface of the first resin-formed body and the stitched inner surface of the covering body. The stitches extend into and are surrounded by the second resin-formed body.

7 Claims, 3 Drawing Sheets

SHIFT KNOB

BACKGROUND OF THE INVENTION

The device relates to a shift knob having a leather made covering body over its outer surfaces.

A conventional shift knob of an automobile automatic transmission system is formed by applying a covering body made of leather over the outer surfaces of a resin-formed body. Specifically, as shown in FIGS. 5 and 6, the outer surfaces of a resin-made body 1 are covered with a plurality of leather pieces 2a, and these leather pieces 2a are stitched (the seams are indicated by 2b) to form a covering body 2. At insertion holes 5, 6, into which a detent button 3 and an overdrive switch 4 are inserted, respectively, the leather pieces 2a are folded back into the respective insertion holes 5, 6, and bezels 7, 8 are attached so as to be interposed between the leather piece and the button 3 and between the leather piece and the switch 4, respectively. Thus, the leather pieces 2a will be tightly fitted and not be loosened out.

The above construction addresses the following problems. The covering body 2 must be prepared by stitching the leather pieces 2a while the outer surfaces of the resin-made body 1 are covered with the pieces, and this entails a cumbersome and time-consuming stitching operation. Also, the bezels 7, 8 must be inserted into the insertion holes 5, 6, which further complicates the overall fabrication process. Further, since the leather pieces 2a must be stitched while covering the resin-formed body 1, the technique of stitching them is so limited allowing little design choice. Furthermore, the bezels 7, 8 are required at the portions into which the detent button 3 and the overdrive switch 4 are inserted to prevent the loosening of the leather pieces 2a, and this increases the number of parts involved in the fabrication.

SUMMARY OF THE INVENTION

The device has been made in view of the above circumstances. Accordingly, an object of the device is to provide a shift knob which can be fabricated easily and allows not only diversification in design but also reduction in the number of required parts.

These objects are met by the shift know of the present invention which comprises a bag-like covering body being formed by stitching leather pieces and a resin-formed body being formed inside the covering body by injection.

The body of the bag-like covering shift knob of the present invention is formed by stitching the leather pieces together before placement on the resin-formed body. Therefore, the stitching is not only easy but also free from restrictions, allowing many designs to be produced. In addition, the resin-formed body is prepared by injection, and this contributes to improving the contact between the covering body and the resin-formed body and thereby dispensing with the bezels.

DETAILED DESCRIPTION OF THE PREFERRED EMBODIMENTS

An embodiment of the device will be described with reference to FIGS. 1 through 4.

Figure 1:
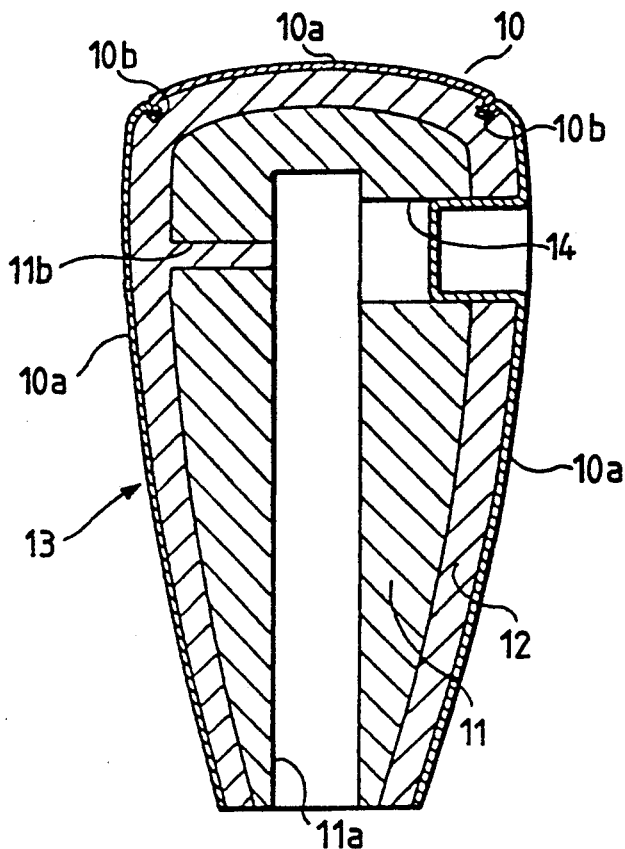
FIG. 1 is a longitudinal sectional view of the entire device of present invention.
Figure 2:
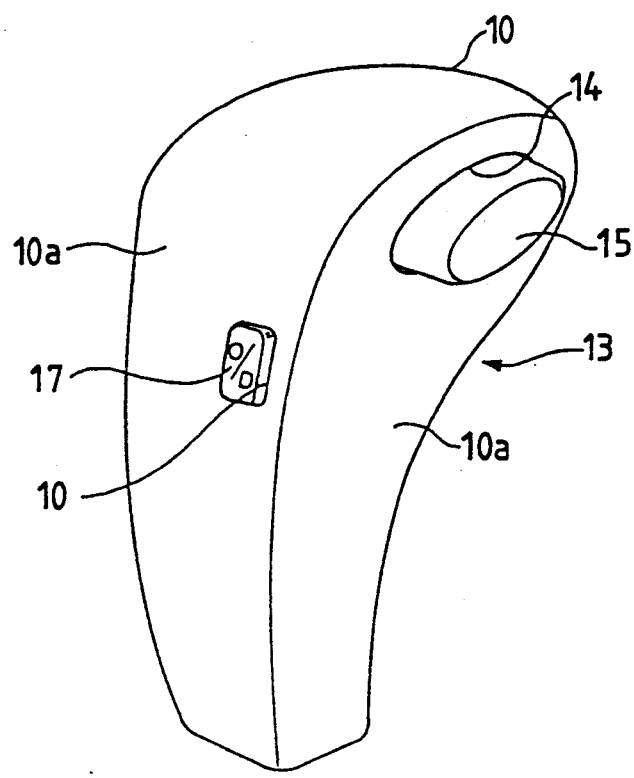
FIG. 2 is a perspective view thereof.
Figure 3:
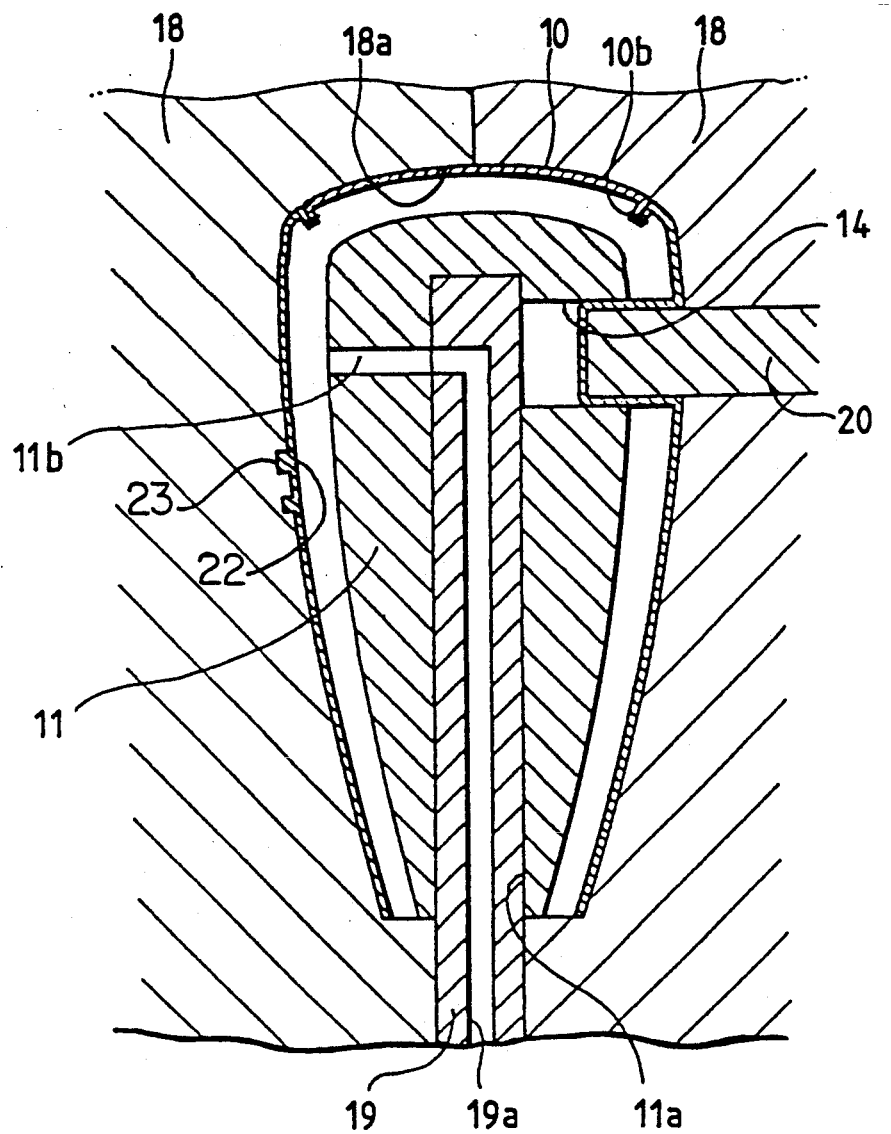
FIG. 3 is a diagram showing a fabrication process of the present invention.

In FIGS. 1 and 2, reference numeral 10 designates a covering body, which is formed into a bag-like profile by stitching, e.g., three pieces 10a of leather (genuine and/or artificial) together (the seams are indicated by 10b). Reference numeral 11 designates an inserting resin-formed body, and in the middle thereof, is an opening 11a into which a shift lever (not shown) of an automatic transmission system is to be inserted. A resin-formed body 12 made of an elastic resin such as urethane resin is injected between the inserting resin-formed body 11 and the covering body 10 to form a shift knob 13, An insertion hole 14 formed on a side surface of the shift knob 13 receives a detent button 15 while an insertion hole 16 formed at a back surface thereof similarly receives an overdrive switch 17.

A process of fabricating such shift knob will be described next.

First, the three pieces of leather 10a are overlapped in pairs and are stitched together at their margins (the seams are indicated by 10b). The bag-like covering body 10 is formed by turning the stitched pieces 10a of the covering body inside out. The covering body 10 is accommodated within a cavity 18a formed by a pair of molds 18 as shown FIG. 3. Then, the opening 11a of the inserting resin-formed body 11 is fitted with an inner mold 19 having a resin injection hole 19a, and the inner mold 19. The is set within the cavity 18a of the mold 18 to locate the inserting resin-formed body 11 inside the covering body 10. Further, a slide core 20 is inserted into the insertion hole 14 thereby to cause a part of the covering body 10 to be brought into pressure contact with the inner surfaces of the insertion hole 14. At this stage, when urethane resin is injected into the resin injection hole 19a of the inner mold 19, the urethane resin is injected between the inserting resin-formed body 11 and the covering body 10 through the hole 11b of the inserting resin-formed body 11, causing the covering body 10 to be brought into pressure contact with the inner surface of the cavity 18a while discharging air in the cavity 18a from an shown air outlet (not shown). When the injected urethane resin is solidified afterwards, a resin-formed body 12 is formed.

Figure 4:
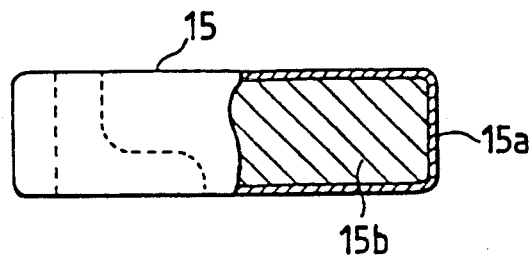
FIG. 4 is a sectional view showing the right half of a detent button.
Figure 5:
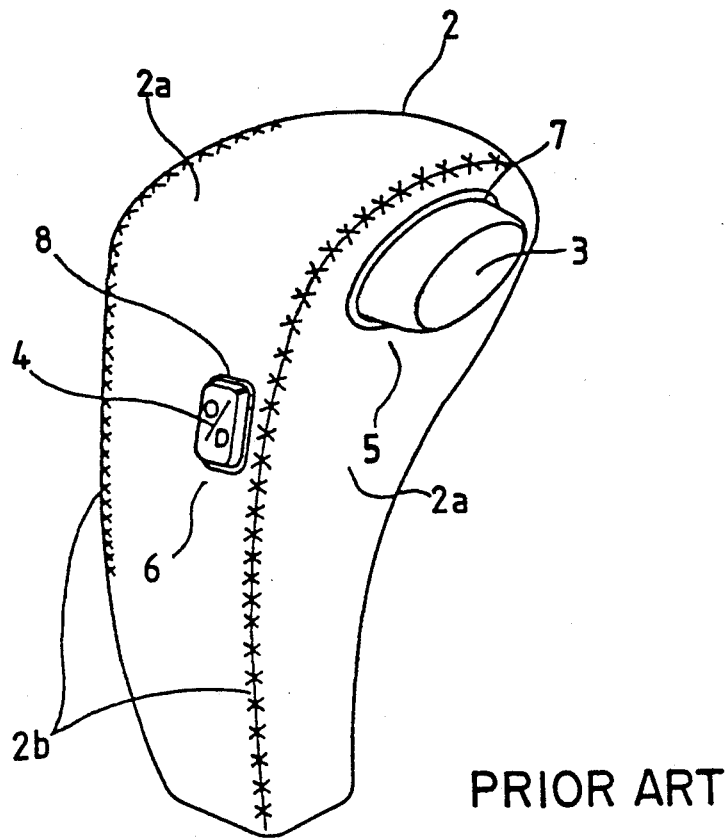
FIG. 5 is a perspective view of a conventional device.
Figure 6:
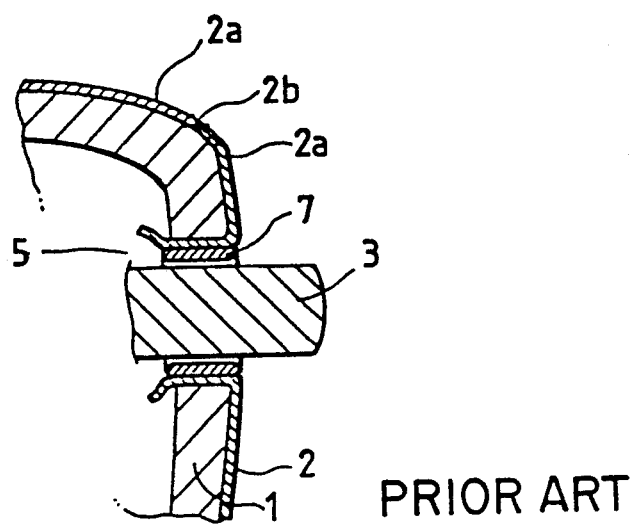
FIG. 6 is a partial longitudinal sectional view of the coventional device.

As shown in FIG. 4, the detent button 15 is also formed by inserting a resin-formed body 15b into a cylindrically shaped covering body 15a made of leather.

According to the thus constructed shift knob, the following advantages can be obtained. The covering body 10 can be formed by stitching the leather pieces 10a in advance from "parts." Thus, unlike the conventional covering body which is formed by stitching the leather pieces 2a with the leather pieces covering the outer surfaces of the resin-formed body 1, the stitching operation involved in the device is easy, allowing the stitching time to be reduced. Further, as described before, since the covering body 10 may be stitched to be bag-like in advance, restrictions such as the number of leather pieces 10a and the stitching mode may be eliminated, thereby allowing a diversity of designs to be produced. Furthermore, since the resin-formed body 12 is prepared by injecting the urethane resin into the covering body 10 and solidifying it therein, the contact between the covering body 10 and the resin-formed body 12 is satisfactory, thereby preventing the covering body 10 from being unfitted from the resin-formed body. Thus, it dispenses with the attaching of the bezels to the insertion holes 14, 16, which contributes to reducing the number of parts. The stitching operation is made easy and less time-consuming, and the use of bezels can be dispensed with, which all contribute to facilitating the fabrication of the shift knob, 13. Moreover, a predetermined pattern, mark or the 21 can be carved into the cavity 18a so that the pattern 22 is easily copied in the surface of the leather pieces. Therefore, the shift knob having a good design is easily manufactured.

The shift knob of the device is formed by stitching the leather pieces to prepare a bag-like covering body and injecting a resin into such covering body to form a resin formed body. Therefore, the advantages such as easy fabrication, diversified designs, and reduction in parts owing to the elimination of bezels can be obtained.

What is claimed is:

1. A shift know comprising:
   a hollow covering body including at least two pieces of material joined together by stitches, the hollow section of the covering body defined by an inner stitched surface;
   a first resin-formed body disposed within said covering body having an outer surface spaced from said inner stitched surface;
   a second resin-formed body disposed in engagement with the entire stitched inner surface, the second resin-formed body disposed to completely fill the space between said outer surface of said first resin-formed body and said stitched inner surface of said covering body, said stitches extending into and being embedded within said second resin-formed body, said second resin-formed body comprising an elastic resin; and
   wherein said first resin-formed body defines at least one means for allowing said elastic resin to be injected through a passage into said space between said inner stitched surface of said covering body and said outer surface of said first resin-formed body.

2. A shift know as claimed in claim 1, further including a raised portion formed on an outer surface of said covering body.

3. A shift know as claimed in claim 1, wherein said first resin-formed body defines at least one hole therethrough for receiving a switch.

4. A shift knob as claimed in claim 3, wherein said second resin-formed body defines at least one aperture therethrough in communication with said hole is said first resin-formed body for receiving said switch.

5. A shift knob as claimed in claim 1, wherein said passage extends through the first resin-formed body, and said second resin-formed body extends into said passage.

6. A shift know as claimed in claim 1, wherein said at least two stitched together pieces of material of said covering body comprise leather.

7. A shift know as claimed in claim 1, wherein said at least two pieces of material define edge portions and are stitched together at said edge portions, said edge portions extend into and are embedded within said second resin-formed body.

* * * * *

UNITED STATES PATENT AND TRADEMARK OFFICE
CERTIFICATE OF CORRECTION

PATENT NO. : 5,289,735
DATED : March 01, 1994
INVENTOR(S) : Hiroyuki Kato, et al.

It is certified that error appears in the above-indentified patent and that said Letters Patent is hereby corrected as shown below:

Claim 1, column 3, line 24, change "know" to --knob--.

Claim 2, column 4, line 12, change "know" to --knob--.

Claim 3, column 4, line 15, change "know" to --knob--.

Claim 4, column 4, line 20, change "is" to --in--.

Claim 6, column 4, line 27, change "know" to --knob--.

Claim 7, column 4, line 30, change "know" to --knob--.

Signed and Sealed this

First Day of November, 1994

Attest:

BRUCE LEHMAN

*Attesting Officer*     *Commissioner of Patents and Trademarks*